(12) United States Patent
Tanioka

(10) Patent No.: US 6,661,921 B2
(45) Date of Patent: *Dec. 9, 2003

(54) IMAGE PROCESS APPARATUS, IMAGE PROCESS METHOD AND STORAGE MEDIUM

(75) Inventor: Hiroshi Tanioka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,312

(22) Filed: Apr. 7, 1999

(65) Prior Publication Data

US 2002/0136456 A1 Sep. 26, 2002

(30) Foreign Application Priority Data

Apr. 10, 1998 (JP) .......................................... 10-115995

(51) Int. Cl.⁷ ................................................. G06K 9/46
(52) U.S. Cl. ........................ 382/190; 382/203; 382/301
(58) Field of Search ................................ 382/181, 190, 382/309, 182, 177–179, 187, 199–200, 203–204, 229, 254, 256, 276, 286, 292, 301, 310–311; 358/401, 501

(56) References Cited

U.S. PATENT DOCUMENTS

| | | | | |
|---|---|---|---|---|
| 4,573,199 A | * | 2/1986 | Chen et al. .................. | 382/301 |
| 4,952,920 A | * | 8/1990 | Hayashi ...................... | 345/658 |
| 4,974,254 A | | 11/1990 | Perine et al. ............... | 379/100 |
| 5,068,888 A | | 11/1991 | Scherk et al. ............... | 379/100 |
| 5,153,744 A | | 10/1992 | Nobuta ....................... | 358/400 |
| 5,170,442 A | * | 12/1992 | Murai et al. ................ | 382/301 |
| 5,199,081 A | * | 3/1993 | Saito et al. ................. | 382/116 |
| 5,420,694 A | * | 5/1995 | Matsumoto .................. | 358/462 |
| 5,493,420 A | * | 2/1996 | Kuwamoto et al. ......... | 358/462 |
| 5,633,954 A | * | 5/1997 | Gupta et al. ................ | 382/187 |
| 5,907,669 A | * | 5/1999 | Yoshiura et al. ........... | 358/1.16 |
| 5,910,805 A | * | 6/1999 | Hickey et al. .............. | 345/467 |
| 5,929,866 A | * | 7/1999 | Arnold ........................ | 345/471 |
| 6,043,823 A | * | 3/2000 | Kodaira et al. ............. | 345/433 |

FOREIGN PATENT DOCUMENTS

| | | |
|---|---|---|
| JP | 62-220072 | 9/1987 |
| WO | 07/07468 | 2/1997 |

* cited by examiner

*Primary Examiner*—Daniel G. Mariam
(74) *Attorney, Agent, or Firm*—Fitzpatrick, Cella, Harper & Scinto

(57) ABSTRACT

An image processing apparatus capable of performing high-quality image reproduction to even low-density and color characters in an original is provided. The character is recognized from an image, the character of the original is expanded into a dot font based on the recognition result, and the image is reproduced. Furthermore, the character density of the original is detected, a character style of the character used in the reproduction image is determined according to the detected character density, a size of the character used in the reproduction image is determined according to the detected character density, and density of the character used in the reproduction image is also determined according to the detected character density. Furthermore, a color of the character of the original is detected, and a color of the character used in the reproduction image is determined according to the detected character color.

9 Claims, 6 Drawing Sheets

FIG. 3

$$\begin{pmatrix}
5 & 5 & 5 & 4 & 6 & 5 & 7 & 5 & 9 & 5 & 8 & 6 & 5 & 5 & 5 \\
5 & 30 & 45 & 30 & 45 & 45 & 45 & 30 & 30 & 45 & 45 & 45 & 30 & 45 & 5 \\
2 & 30 & 135 & 116 & 116 & 135 & 116 & 105 & 135 & 135 & 116 & 116 & 135 & 45 & 5 \\
5 & 30 & 135 & 140 & 200 & 185 & 210 & 200 & 200 & 185 & 185 & 185 & 116 & 45 & 2 \\
4 & 45 & 135 & 180 & 200 & 200 & 200 & 185 & 210 & 200 & 200 & 200 & 105 & 30 & 5 \\
5 & 45 & 116 & 160 & 200 & 200 & 210 & 185 & 200 & 200 & 210 & 200 & 135 & 30 & 5 \\
1 & 30 & 116 & 130 & 185 & 200 & 200 & 185 & 185 & 145 & 200 & 200 & 116 & 45 & 5 \\
3 & 45 & 135 & 160 & 185 & 200 & 135 & 135 & 116 & 116 & 116 & 116 & 105 & 45 & 5 \\
5 & 45 & 116 & 155 & 200 & 200 & 116 & 45 & 45 & 30 & 30 & 45 & 45 & 30 & 5 \\
5 & 45 & 116 & 140 & 210 & 185 & 116 & 116 & 135 & 116 & 105 & 45 & 5 & 5 & 6 \\
8 & 45 & 116 & 130 & 200 & 185 & 200 & 200 & 185 & 185 & 105 & 45 & 5 & 2 & 5 \\
5 & 30 & 116 & 140 & 200 & 210 & 210 & 200 & 200 & 200 & 116 & 45 & 5 & 6 & 5 \\
5 & 30 & 135 & 133 & 200 & 185 & 200 & 200 & 200 & 185 & 116 & 30 & 5 & 4 & 5 \\
9 & 30 & 135 & 145 & 200 & 185 & 135 & 116 & 116 & 116 & 105 & 45 & 5 & 5 & 5 \\
4 & 30 & 135 & 120 & 200 & 185 & 116 & 45 & 45 & 30 & 30 & 45 & 1 & 8 & 5 \\
5 & 45 & 135 & 136 & 200 & 200 & 105 & 45 & 5 & 5 & 5 & 5 & 5 & 5 & 5 \\
5 & 30 & 116 & 148 & 200 & 200 & 116 & 30 & 5 & 5 & 5 & 5 & 5 & 5 & 5 \\
4 & 30 & 116 & 140 & 200 & 210 & 135 & 45 & 5 & 7 & 5 & 5 & 5 & 5 & 5 \\
5 & 30 & 116 & 138 & 200 & 200 & 135 & 45 & 5 & 5 & 5 & 0 & 5 & 5 & 5 \\
6 & 45 & 116 & 144 & 210 & 200 & 116 & 45 & 5 & 5 & 5 & 5 & 5 & 5 & 5 \\
3 & 45 & 135 & 136 & 200 & 200 & 116 & 30 & 5 & 5 & 8 & 5 & 5 & 5 & 5 \\
5 & 45 & 135 & 144 & 200 & 200 & 105 & 45 & 5 & 5 & 5 & 5 & 5 & 5 & 4 \\
5 & 30 & 116 & 151 & 200 & 200 & 116 & 45 & 6 & 5 & 5 & 5 & 5 & 5 & 5 \\
2 & 30 & 116 & 151 & 210 & 210 & 135 & 45 & 5 & 2 & 5 & 2 & 5 & 5 & 5 \\
5 & 45 & 105 & 135 & 116 & 105 & 105 & 30 & 5 & 2 & 5 & 2 & 5 & 5 & 5 \\
5 & 30 & 45 & 45 & 30 & 45 & 45 & 30 & 5 & 6 & 5 & 5 & 5 & 7 & 5 \\
5 & 5 & 5 & 5 & 5 & 5 & 5 & 5 & 5 & 5 & 5 & 1 & 5 & 5 & 5
\end{pmatrix}$$

FIG. 4

$$\begin{Bmatrix} 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 0 & 0 & 0 & 0 & 1 & 1 & 1 & 1 & 1 & 1 & 1 & 1 & 0 & 0 & 0 \\ 0 & 0 & 0 & 1 & 1 & 1 & 1 & 1 & 1 & 1 & 1 & 1 & 0 & 0 & 0 \\ 0 & 0 & 0 & 1 & 1 & 1 & 1 & 1 & 1 & 1 & 1 & 1 & 0 & 0 & 0 \\ 0 & 0 & 0 & 0 & 1 & 1 & 1 & 1 & 1 & 0 & 1 & 1 & 0 & 0 & 0 \\ 0 & 0 & 0 & 1 & 1 & 1 & 0 & 0 & 0 & 0 & 0 & 0 & 0 & 0 & 0 \\ 0 & 0 & 0 & 1 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 1 & 1 & 1 & 1 & 0 & 0 & 0 & 0 & 0 \\ 0 & 0 & 0 & 0 & 1 & 1 & 1 & 1 & 1 & 1 & 0 & 0 & 0 & 0 & 0 \\ 0 & 0 & 0 & 0 & 1 & 1 & 1 & 1 & 1 & 1 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 \\ 0 & 0 & 0 & 1 & 1 & 1 & 0 & 0 & 0 & 0 & 0 & 0 & 0 & 0 & 0 \\ 0 & 0 & 0 & 1 & 1 & 1 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \end{Bmatrix}$$

FIG. 5

$$\begin{Bmatrix}
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 200 & 185 & 210 & 200 & 200 & 185 & 185 & 185 & 0 & 0 & 0 \\
0 & 0 & 0 & 180 & 200 & 200 & 200 & 185 & 210 & 200 & 200 & 200 & 0 & 0 & 0 \\
0 & 0 & 0 & 160 & 200 & 200 & 210 & 185 & 200 & 200 & 210 & 200 & 0 & 0 & 0 \\
0 & 0 & 0 & 0 & 185 & 200 & 200 & 185 & 185 & 0 & 200 & 200 & 0 & 0 & 0 \\
0 & 0 & 0 & 160 & 185 & 200 & 0 & 0 & 0 & 0 & 0 & 0 & 0 & 0 & 0 \\
0 & 0 & 0 & 155 & 200 & 200 & 0 & 0 & 0 & 0 & 0 & 0 & 0 & 0 & 0 \\
0 & 0 & 0 & 0 & 210 & 185 & 0 & 0 & 0 & 0 & 0 & 0 & 0 & 0 & 0 \\
0 & 0 & 0 & 0 & 200 & 185 & 200 & 200 & 185 & 185 & 0 & 0 & 0 & 0 & 0 \\
0 & 0 & 0 & 0 & 200 & 210 & 210 & 200 & 200 & 200 & 0 & 0 & 0 & 0 & 0 \\
0 & 0 & 0 & 0 & 200 & 185 & 200 & 200 & 200 & 185 & 0 & 0 & 0 & 0 & 0 \\
0 & 0 & 0 & 0 & 200 & 185 & 0 & 0 & 0 & 0 & 0 & 0 & 0 & 0 & 0 \\
0 & 0 & 0 & 0 & 200 & 185 & 0 & 0 & 0 & 0 & 0 & 0 & 0 & 0 & 0 \\
0 & 0 & 0 & 0 & 200 & 200 & 0 & 0 & 0 & 0 & 0 & 0 & 0 & 0 & 0 \\
0 & 0 & 0 & 0 & 200 & 200 & 0 & 0 & 0 & 0 & 0 & 0 & 0 & 0 & 0 \\
0 & 0 & 0 & 0 & 200 & 210 & 0 & 0 & 0 & 0 & 0 & 0 & 0 & 0 & 0 \\
0 & 0 & 0 & 0 & 200 & 200 & 0 & 0 & 0 & 0 & 0 & 0 & 0 & 0 & 0 \\
0 & 0 & 0 & 0 & 210 & 200 & 0 & 0 & 0 & 0 & 0 & 0 & 0 & 0 & 0 \\
0 & 0 & 0 & 0 & 200 & 200 & 0 & 0 & 0 & 0 & 0 & 0 & 0 & 0 & 0 \\
0 & 0 & 0 & 0 & 200 & 200 & 0 & 0 & 0 & 0 & 0 & 0 & 0 & 0 & 0 \\
0 & 0 & 0 & 151 & 200 & 200 & 0 & 0 & 0 & 0 & 0 & 0 & 0 & 0 & 0 \\
0 & 0 & 0 & 151 & 210 & 210 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0
\end{Bmatrix}$$

FIG. 6

$$\left\{\begin{array}{ccccccccccccccc}
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 158 & 158 & 158 & 158 & 158 & 158 & 158 & 158 & 0 & 0 & 0 \\
0 & 0 & 0 & 0 & 158 & 158 & 158 & 158 & 158 & 158 & 158 & 158 & 0 & 0 & 0 \\
0 & 0 & 0 & 0 & 158 & 158 & 158 & 158 & 158 & 158 & 158 & 158 & 0 & 0 & 0 \\
0 & 0 & 0 & 0 & 158 & 158 & 158 & 158 & 158 & 158 & 158 & 158 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 158 & 158 & 158 & 158 & 0 & 0 & 0 & 0 & 0 \\
0 & 0 & 0 & 0 & 158 & 158 & 158 & 158 & 158 & 158 & 0 & 0 & 0 & 0 & 0 \\
0 & 0 & 0 & 0 & 158 & 158 & 158 & 158 & 158 & 158 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 158 & 158 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 \\
\end{array}\right.$$

IMAGE PROCESS APPARATUS, IMAGE PROCESS METHOD AND STORAGE MEDIUM

BACKGROUND OF THE INVENTION

1. Field of the Invention

The present invention relates to an image process apparatus, an image process method and a storage medium.

2. Related Background Art

In a character recognition technique which is used in an image process apparatus to recognize a character on the basis of an image signal read from an original, it is possible to perform a substantial real-time process especially at copying speed of a low-speed copy machine or so because process speeds of CPUs and semiconductors have been significantly improved in recent years.

Furthermore, in recent years, since almost all the originals to be copied are formed by type with use of a word processor or the like, recognition accuracy to these documents improves, whereby the character recognition technique has reached a practical level.

In this connection, various techniques to recognize the character and its size in the original are proposed.

By the way, in the copy machine of this type, an image is analyzed into dots at certain resolution and then managed and processed. Therefore, in a case where a document obtained by the copy is used as the original to be further copied, especially in a case where such the document is used for the reduction copy, deterioration of quality in the reproduction image is inevitable in principle.

SUMMARY OF THE INVENTION

In consideration of the above-described drawback, an object of the present invention is to provide an image process apparatus, an image process method and a storage medium which are possible to realize high-quality image reproduction.

Another object of the present invention is to provide an image process apparatus, an image process method and a recording medium which are possible to reproduce a character-recognized image as a desired-density image.

In order to achieve the above object, the present invention provides an image processing apparatus comprising:

- an input means for inputting an image signal representing an image;
- a character recognition means for recognizing a character in the image on the basis of the image signal input by the input means;
- a density detection means for detecting a density of the character recognized by the character recognition means;
- an instruction input means for inputting an instruction by an operator for reproduction image formation; and
- an image formation means for generating a reproduction image signal on the basis of the instruction input by the input means, the recognition result by the character recognition means and the detection result by the density detection means.

Another object of the present invention is to provide an image process apparatus, an image process method and a recording medium each of which has a novel function.

Other objects and features of the present invention will become apparent from the following detailed description and the attached drawings.

BRIEF DESCRIPTION OF THE DRAWINGS

FIG. 3 is a view showing an actual example of data transition in an image buffer according to the process of the image process apparatus shown in FIG. 1;

FIG. 4 is a view showing an actual example of data transition in the image buffer according to the process of the image process apparatus shown in FIG. 1;

FIG. 5 is a view showing an actual example of data transition in the image buffer according to the process of the image process apparatus shown in FIG. 1; and FIG. 6 is a view showing an actual example of data transition in the image buffer according to the process of the image process apparatus shown in FIG. 1.

DETAILED DESCRIPTION OF THE PREFERRED EMBODIMENTS

Figure 1:
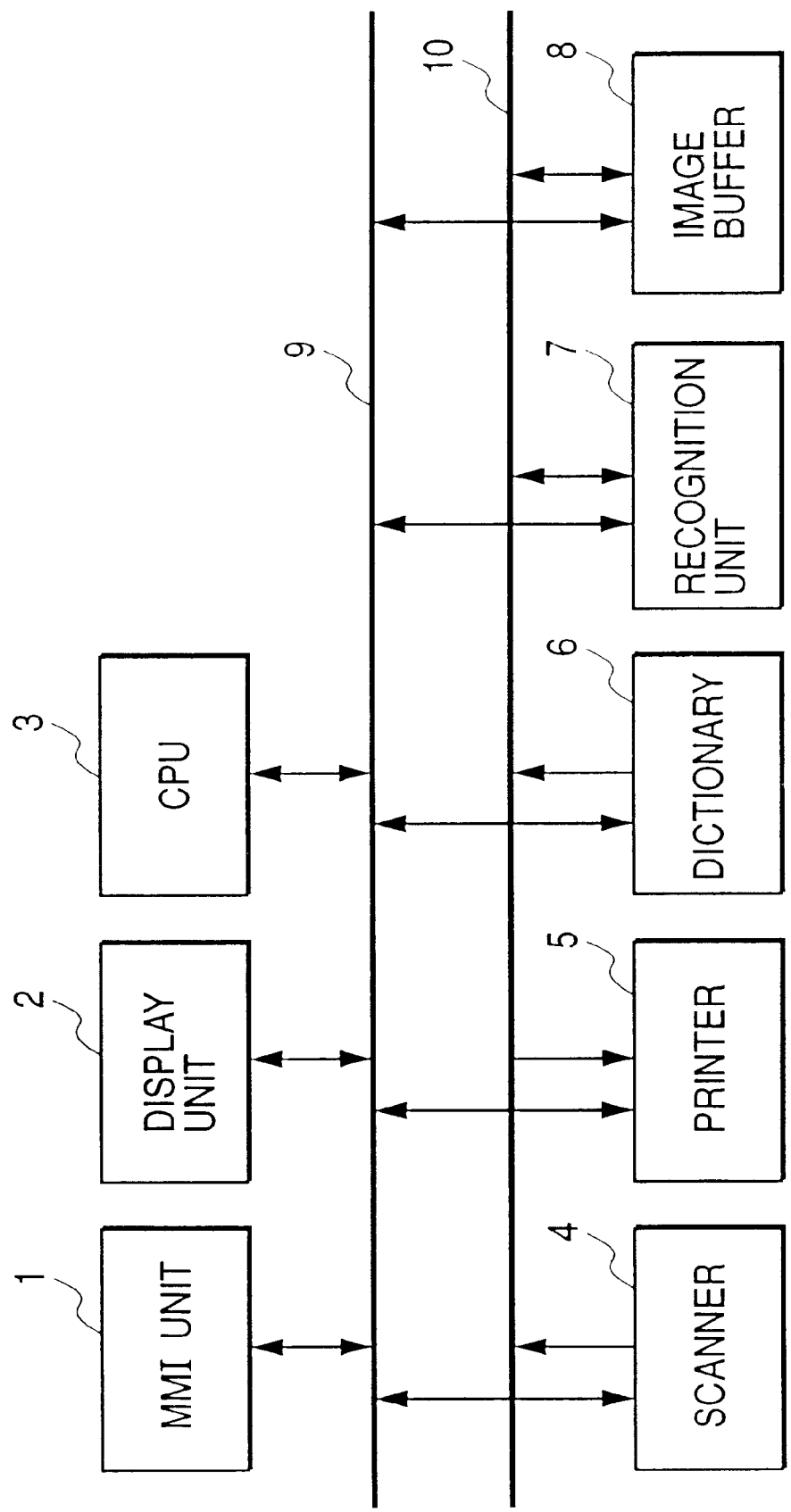
FIG. 1 is a block diagram showing the structure of an image process apparatus according to an embodiment of the present invention.

FIG. 1 is a block diagram showing the structure of an image process apparatus according to the embodiment of the present invention. Hereinafter, the outline of a system according to the present invention will be explained with reference to FIG. 1.

A CPU 3 controls a scanner 4 connected to a CPU bus 9 to read an image of an ordinary original, and stores and holds image data according to the read image in an image buffer 8 connected to an image data bus 10.

A recognition unit 7 recognizes a character in the original from the image data of the image buffer 8, and detects character information such as a character size, a character position and the like. Furthermore, as a result of so-called character recognition, the recognition unit 7 obtains character code information from the image data by referring to a dictionary 6.

The image buffer 8 once stores the recognized character code information, character density information, position information and the like, and then processes the stored information according to an operator's instruction to the system issued from a man-machine interface (MMI) unit 1.

The MMI unit 1 has various input keys, light emitting diodes (LEDs) for displaying their operation states, and the like. As an operator watches a menu screen, a guidance screen and the like displayed on a display unit 2 such as a liquid crystal display (LCD), he performs various key operations.

A printer 5 is, e.g., a color laser beam printer for printing out the image data subjected to various image processes onto a recording sheet.

Subsequently, how to generate reproduction image data according to the embodiment will be explained in detail, with use of a case where the character image of the original is read, the density of the read image is adjusted, and the obtained image is reproduced, by way of example.

Figure 2:
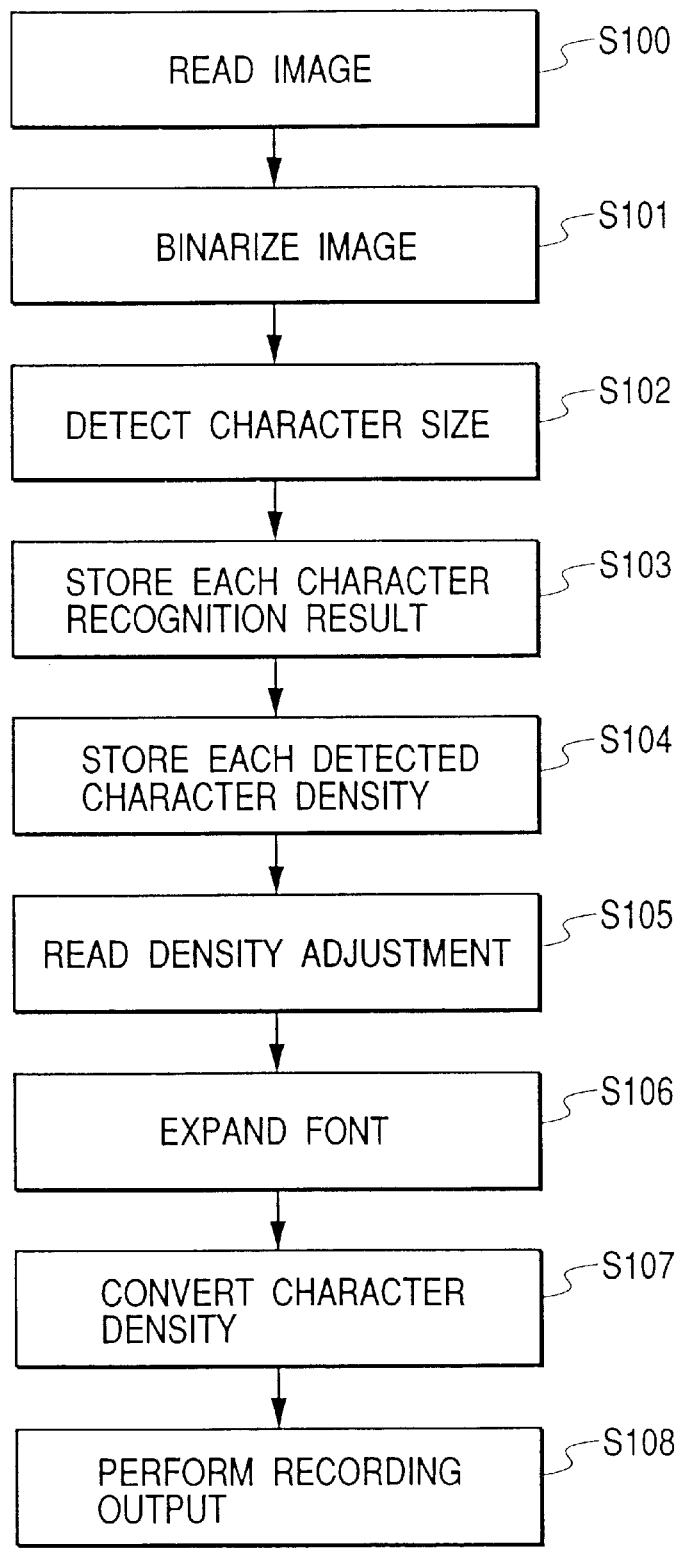
FIG. 2 is a flow chart showing the flow of a process performed by the image process apparatus shown in FIG. 1.

FIG. 2 is a flow chart showing the process to be performed in this case. FIGS. 3, 4, 5 and 6 are views showing actual examples of data transition in the image buffer 8 according to the process shown in the flow chart of FIG. 2.

Initially, e.g., in a case where the image of the width 200 mm is read along the short edge of an A4 original at resolution 600 dpi, each pixel is read as an eight-bit density signal (step S100). In this step, as shown in FIG. 3, each pixel data is once stored in the image buffer 8 in an eight-bit ("0" to "255") state.

To perform the character recognition, the image data is binarized by using as a threshold the average value of densities of peripheral pixels existing in the vicinity of a remarked pixel (or target pixel). In a case where the original includes a dark black character, a color character and a light black character, if the image data is binarized by using as the threshold the density average value of the pixels within the entire (or wide) range from the dark black character to the light black character, the light black character is binarized into the value "0". Thus, it is impossible to visibly recognize the light black character. Here, the reason why the average density value of the peripheral pixels is used but the value of a wider range is not used as the threshold is to enable accurate character recognition not only to the dark black character but also to the color character and the light black character in the original, and further to perform image reproduction at intermediate density.

FIG. 4 shows the example that each image data in the image buffer 8 of FIG. 3 is binarized by using the threshold "150". That is, the pixel darker than the threshold is binarized to have the value "1" (step S101).

In the step S100, the total number of pixels in one line read and stored in the image buffer 8 is "4724". Therefore, if a so-called histogram is formed by adding the binarized value "1" and the number of binarized pixels together in a direction perpendicular to each pixel line, it is possible to detect the number of characters arranged along the short edge of the original and the size of average one character (step S102).

For example, if it is detected that the 40 same-size characters exist, the width of one character is calculated as 118.1 pixels (=4724/40). In this case, the width of one character is defined as the width obtained by adding the size of the actual character in the lateral direction (i.e., short edge direction) and the space between the adjacent characters. It should be noted that, if the same process is performed in the direction perpendicular to the lateral direction, it is possible to obtain the height of one character. Also in this case, the height of one character is defined as the value obtained by adding the space between the adjacent lines and the height of the actual character.

In order to simplify the following explanation and the drawings, the obtained character size is assumed to be the character width 15 pixels and the character height 27 pixels. In this case, if the original is divided into rectangular frames each having the 15×27 pixels (referred as mesh hereinafter), each mesh includes one character. That is, since each of the images shown in FIGS. 3 and 4 is represented by the 15×27 pixels, each image represents one mesh including one character in the original.

Therefore, it is possible to visibly recognize that the character represented by the image data shown in FIG. 4 is "F" because the pattern composed of the binarized values "1" within one mesh forms the shape of "F". Then, the character code information obtained as a result of such the character recognition is stored at a predetermined area in the image buffer 8 with correspondence to the mesh (step S103). However, as shown in FIG. 4, it is impossible to detect the density of this character "F" on the basis of the binarized image.

Therefore, in the embodiment, the density of the pattern corresponding to the character in the mesh is detected to determine the density of this character. That is, as to the former multivalue image signal shown in FIG. 3, only the multivalue density level corresponding to each "1" of the binarized image shown in FIG. 4 is added, and the average density value of thus processed pixels is handled as the character density information of this original showing the character "F". In other words, the binarization result and the former multivalue density level are multiplied together as to each pixel in one mesh, the obtained values are summed up, and the summed value is then divided by the total number of "1", thereby determining the average density value. The obtained density information is then stored at a predetermined area in the image buffer 8 with correspondence to the-mesh (step S104).

Here, the character density information of the original to be finally obtained is defined as "G", the multivalue image data of each pixel shown in FIG. 3 is defined as "$D_n$", and the binarized image data of each pixel shown in FIG. 4 is defined as "$B_n$". Thus, the above process can be conceptually represented by the following equation.

$$G=(\Sigma D_n \times B_n)/\Sigma B_n$$

where symbol "$\Sigma$" represents an addition process for each image in the 15×27 pixel area.

FIG. 5 shows the calculation result of "$D_n \times B_n$" for each pixel. If this calculation is performed according to the above-described equation, the density G of the character "F" is obtained as about "193".

Therefore, if such the average density is previously stored as the recognition result in the image buffer 8 together with the character size and the character code, it is possible to reproduce the character image with use of the halftone-level font character instead of the mere black font character.

For example, if it is instructed by the operator from the MMI unit 1 to reproduce the image at density 20% thinner (or lower) than the original density (step S105), then the character code stored with the predetermined size is sequentially read out and subjected to so-called font expansion to generate one-bit dot data representing the shape of the character (step S106). Then, the original density value of this character is converted according to the instruction (step S107). For example, in the embodiment, the density value of the reproduction character is converted into "158" (=198 ×0.8). After then, the character to be reproduced is subjected to recording output (step S108).

FIG. 6 shows the final image data which is obtained in the case where the character "F" is subjected to the font expansion at the identical size, the density of the font-expanded image is made 20% thinner (or lower) than the original density, and the character "F" is reproduced.

In the above explanation, the character density of the original is processed with eight bits. However, in another method to determine the character density, the number of used bits may be lowered to, e.g., four bits (i.e., 16 levels) or so to reduce a data quantity. In this case, each level uses, e.g., upper four bits of the former eight-bit density signal. Then, such the four-bit signal may be converted into the eight-bit signal and used in the character reproduction.

Furthermore, such a bit reduction process may be performed when the multivalue data is stored in the image buffer, or after the average density addition for only the character portion is performed. In the former case, it is possible to save the size of the image buffer, while in the latter case, it is possible to obtain satisfactory density reproducibility.

As further another method to determine the character density, the embodiment is applicable to a color image. In this case, the average level value of the character portion may be calculated to an RGB (three colors; red, green and blue) color space, an YMCK (four colors; yellow, magenta, cyan and black) color space, a CMY (three colors; cyan, magenta and yellow) color space, an Lab color space or the like.

However, for example, in case of the RGB color space or the CMY color space, the data of the average value "(R +G +B)/3" or "(C +M +Y)/3" of the color-separated values for each pixel is used in the binarization for the character recognition. Furthermore, if the color is separated in such the L space as representing luminance, the data may be binarized for the L space.

Furthermore, even if eight bits are not used for each color space, three bits or so are generally sufficient to such the color space.

The color character can be represented by a recording apparatus used. For example, the reproduction image signal is generated as the CMYK four-color recording signal. However, if it is possible to consider that the character can be reproduced with black single color, the color signals other than the black single color signal are set to be "0". Thus, it is possible to prevent that color misregistration occurs in the color recording, thereby enabling high-quality image reproduction for even a smaller character.

Furthermore, in a case where a copy mode is being set, if the complete binary recording is performed irrespective of the density of the original, it is obviously understood that the above step S104 for obtaining the character density is omitted from the process and all the pixels are uniformly managed as maximum density "255" pixels. However, even in this case, if the operator manually adjusts the density, it is possible to reproduce all the character images uniformly at the halftone density value.

Furthermore, as another method to form the reproduction image based on the character density of the original, the character density may be reflected on a character style (or typeface).

That is, if the density of the character on the original is low, it is possible to convert the character style of this character into, e.g., an oblique style irrespective of the original style when this character is reproduced, because of the following reason. For example, if the recording apparatus used to reproduce the character can not perform halftone representation, since each recording dot font-expanded as the recording signal can not be reflected on the recording density of the reproduction image, the font to be used is made different from that of the other characters, thereby enabling to represent the difference of the target character from the other characters on the reproduction image.

As the character style, a so-called decorated style is also useful in addition to the oblique style. Furthermore, if the character size is converted into that capable being held within one mesh, the same effect as above can be derived.

In the case where the character density is reflected on the character style by providing a selectable means (e.g., mode setting means) at the MMI unit, if the operator selects what kind of the character style is to be used or whether or not the character size is to be converted, it is possible to realize such the processes as above.

According to the embodiment, since the character of the original is recognized and the reproduction image is formed based on the font determined from the recognition result, it is possible to prevent quality deterioration especially in a small character or the like. Furthermore, in the case where the image obtained by the copy is used as the original to be further copied, it is possible to prevent quality deterioration in the reproduction image in principle. Furthermore, it is possible to perform the image reproduction according to the color character, the character density and the like of the original.

Although the above process (i.e., process in flow chart of FIG. 2) according to the embodiment is performed by the CPU 3 on the basis of the control program previously stored in the ROM or the like, this process may be performed in such a manner as the same control program has been previously stored in a storage medium such as a floppy disk, a hard disk, a CD-ROM, a memory card or the like and then the stored program is fetched and executed by the CPU 3. That is, the operation that program codes indicating the above process are stored in the storage medium (floppy disk, hard disk, CD-ROM, memory card, etc.), the codes stored are read, and a digital image input from a scanner or a digital camera is processed by a CPU in a personal computer according to the read codes may be performed.

As explained above, according to the embodiment, the character of the original is recognized and the reproduction image is formed on the basis of the recognition result. Therefore, it is possible to prevent the quality deterioration especially in the small character or the like. Furthermore, even in the case where the image obtained by the copy is used as the original to be further copied, it is possible to prevent the quality deterioration in the reproduction image. Furthermore, it is possible to perform the image reproduction according to the density of the original image.

In the above embodiment, the entire image corresponding to the original is uniformly subjected to the character recognition. However, in a case where the part of the original includes the type which can be easily recognized and of which quality deterioration in the reproduction process is low and the other part thereof includes the hand-written character which is difficult to be recognized, it is preferable to vary the character recognition for each part.

In this case, only the hand-written character area of which quality deterioration in the reproduction process is inevitable may be designated as the area which is to be subjected to the character recognition, by applying the structure for manually performing original area designation with use of a not-shown digitizer.

By applying such the structure, since it is possible to limit the area which is to be subjected to the character recognition, it is possible to lower a character recognition processing quantity and a processing time.

As above, in the case where the part of the original includes the type which can be easily recognized and of which quality deterioration in the reproduction process is low and the other part thereof includes the hand-written character which is difficult to be recognized, the above area designation method is used. Therefore, it is possible to instruct the image process apparatus to recognize the type part in a first recognition algorithm of which processing speed is fast but recognition accuracy to the hand-written character other than the type is low, while to recognize the hand-written character part in a second recognition algorithm of which processing speed is lower than that of the first algorithm but recognition accuracy to the hand-written character other than the type is high.

As above, by adaptively varying the recognition algorithm according to the state of the original, it is possible to improve the processing quantity, the processing time and the image recognition accuracy without the processing speed being so lowered.

If the means for performing the above process in the embodiment is realized by a software process that code information is read from a storage medium (CD-ROM, hard disk, floppy disk, etc.) previously storing programs and the read code information is processed by a computer, a serious long period of time is necessary to the process in accordance with the capability of a CPU used in the computer. However, since the process is controlled according to the area as explained above, it is possible to sufficiently lower the processing quantity and time.

Furthermore, in the embodiment, the manual area designation is performed on the original. However, the present invention is not limited to this. That is, by separately preparing a monitor unit for display of the image according to the original, the manual area designation may be performed on this monitor. Furthermore, the pointing device to be used in the manual area designation is not limited to the digitizer. That is, a mouse of the like may be used as the pointing device.

What is claimed is:

1. An image processing apparatus comprising:
    an input unit for inputting an image signal representing an image on an original by reading the original;
    a character recognition unit for recognizing a character in the image on the basis of the image signal input by said input unit;
    a density detector for detecting a density of the character recognized by said character recognition unit;
    an instruction input unit for inputting an instruction by an operator to convert the density detected by said density detector; and
    an image formation unit for performing font expansion to generate data representing a shape of the character recognized by said character recognition unit, and for performing image reproduction by converting the expanded font data on the basis of the density of the character detected by said density detector and the instruction input by said instruction input unit.

2. An apparatus according to claim 1, wherein a character style or a typeface of the character used in the reproduction image is determined according to the character density detected by said density detector.

3. An apparatus according to claim 1, wherein a size of the character used in the reproduction image is determined according to the character density detected by said density detector.

4. An apparatus according to claim 1, wherein density of the character used in the reproduction image is determined according to the character density detected by said density detector.

5. An apparatus according to claim 1, further comprising character color detector for detecting a color of the character recognized by said character recognition unit, wherein a color signal representing the character used in the reproduction image is determined according to the character color detected by said character color detector.

6. An apparatus according to claim 5, further comprising an image memory for storing information concerning the recognition result by said character recognition unit, the detection result by said density detector, and the detection result by said character color detector.

7. An apparatus according to claim 1, further comprising an image memory for storing information concerning the recognition result by said character recognition unit and the detection result by said density detector.

8. An image processing method comprising the steps of:
    recognizing a character in an image on an original on the basis of an image signal obtained from the image by reading the original;
    detecting a density of the recognized character;
    inputting an instruction by an operator to convert the density detected in said detecting step; and
    performing font expansion to generate data representing a shape of the character recognized in said character recognition step, and performing image reproduction by converting the expanded font data on the basis of the density detected in said density detection step and the instruction input in said inputting step.

9. A computer readable storage medium which stores therein a program to control an image processing apparatus for reading and reproducing an original, the stored program executing:
    a character recognition step of recognizing a character in an image on an original on the basis of an image signal obtained from the image by reading the original;
    a density detection step of detecting a density of the character recognized in said character recognition step;
    an instruction input step of inputting an instruction by an operator to convert the density detected in said density detection step; and
    an image formation step of performing font expansion to generate data representing a shape of the character recognized in said character recognition step, and performing image reproduction by converting the expanded font data on the basis of the density detected in said density detection step and the instruction input in said instruction input step.

* * * * *